US012599064B1

(12) United States Patent
Steinhaus, Jr.

(10) Patent No.: US 12,599,064 B1
(45) Date of Patent: Apr. 14, 2026

(54) LANDSCAPE BED EDGING TOOL ASSEMBLY

(71) Applicant: Robert Lawrence Steinhaus, Jr., Verona, PA (US)

(72) Inventor: Robert Lawrence Steinhaus, Jr., Verona, PA (US)

( * ) Notice: Subject to any disclaimer, the term of this patent is extended or adjusted under 35 U.S.C. 154(b) by 386 days.

(21) Appl. No.: 18/457,487

(22) Filed: Aug. 29, 2023

Related U.S. Application Data

(60) Provisional application No. 63/375,316, filed on Sep. 12, 2022.

(51) Int. Cl.
*A01G 3/06* (2006.01)

(52) U.S. Cl.
CPC ...................................... *A01G 3/06* (2013.01)

(58) Field of Classification Search
CPC .. A01G 9/28; A01G 13/27; A01G 3/06; E01C 11/221; E01C 15/00
See application file for complete search history.

(56) References Cited

U.S. PATENT DOCUMENTS

| | | | | |
|---|---|---|---|---|
| 2,851,935 A | * | 9/1958 | Weeks | E01F 9/588 404/13 |
| 4,905,409 A | * | 3/1990 | Cole | A01G 9/28 47/33 |

| | | | | |
|---|---|---|---|---|
| 5,133,163 A | * | 7/1992 | Christensen | F16L 9/133 52/102 |
| 5,157,867 A | * | 10/1992 | Fritch | A01G 9/28 47/33 |
| 10,463,936 B1 | * | 11/2019 | Lanuti | A63B 67/02 |
| 2005/0005511 A1 | * | 1/2005 | Sacks | A01G 9/28 47/33 |

FOREIGN PATENT DOCUMENTS

| | | | | |
|---|---|---|---|---|
| KR | 200356601 Y1 | * | 7/2004 | A01G 9/28 |
| WO | WO-2005055701 A1 | * | 6/2005 | A01G 9/28 |

OTHER PUBLICATIONS

English translation (Year: 2004).*

* cited by examiner

*Primary Examiner* — Peter M Poon
*Assistant Examiner* — Danielle A Clerkley

(57) ABSTRACT

A landscape tool assembly comprising at least tubular body, angled connector and fastener for designing, marking and cutting proposed landscape beds. The tubular body has a trapezoidal cross section, a hollow interior space, and opposed top and bottom sides formed with a plurality of fastener receiving apertures sized and shaped to receive a garden stake or other fastener for securing the tubular body to a ground surface, and an angled bed facing side upon which an edging shovel is positioned to cut a proposed landscape bed edge. The tubular body is further formed with four edges, each edge formed with a series of diamond shaped slits to allow the tubular body to flex and deform. The connector mates and removably joins two tubular bodies during the designing, marking and cutting process. A method of use is also provided.

16 Claims, 16 Drawing Sheets

LANDSCAPE BED EDGING TOOL ASSEMBLY

CROSS-REFERENCE TO RELATED APPLICATIONS

This application claims priority to and benefit from US provisional application Ser. No. 63/375,316 filed on 12 Sep. 2022 and claimed under all applicable sections of Title 35 of the United States Code including, but not limited to, Sections 120, 121, and 365(c), and which in its entirety is incorporated by reference into this application.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of tools used for landscaping, specifically, a landscape bed edging tool assembly used to assist a user to dig a consistent angle landscape bed edge around a planting bed.

Background Art

The most beautiful and pleasing landscape designs involve neatly laid out landscape beds with professionally cut bed edges that are both symmetrical and consistently angled. While cutting an edge into an existing lawn to make a landscape bed edge involves no more than an edging shovel and some manual labor, cutting consistent, neat and symmetrically angled cuts is a tedious and time-consuming chore. Great care must be used when cutting the edge. The simplest edge is vertical and perpendicular to the bed, but the most visually attractive edge is angled approximately 70 degrees above from the grass surface. Consistent, consecutive cuts are thus tricky, and like any other skill, it is acquired through practice. Different landscape contractors working on the same landscape design are prone to cutting the edge a little differently, thus creating issues with the overall design and ruining the repetitive aesthetic that the cut edge is intended to convey. Landscape contract work is labor intensive and it is not feasible to have just a few people specialized in cutting edges do this work to maintain the consistency of the cut edge. Most often, everyone on the crew will grab shovels and do their best to make the edge look more or less the same.

Another major issue with landscape bed design is that the bed itself must be carefully measured and the edge marked prior to cutting to ensure smooth, symmetrical shapes are created. Part of the appeal of a well-designed and executed landscape are the distinctive bed shapes, and along with symmetrical, pleasing shapes, sharp angles and turns are also highly desirable and cannot be well executed without planning and measuring. A simple circular tree ring is surprisingly difficult to cut free hand with a shovel, and a string line is often used to ensure the symmetry of the ring. Larger beds are painstakingly premeasured using measuring tapes and multiple string lines. Once measured, the edges must be pre-marked and there currently is no standard way of marking the edges. Some contractors use spray paint, others use removable stakes, still more use garden hose or string to lay out the beds. Again, this work is time-consuming and tedious, but necessary to ensure a pleasing result.

What is needed is a tool that allows a symmetrical bed edge to be both planned and consistently cut quickly and easily. What is also needed is a tool that allows design adjustments in the field just prior to cutting the bed edge.

DISCLOSURE OF INVENTION

In a first aspect of the invention, a landscape tool for marking a landscape bed edge on a ground surface is a trapezoidal prism having a tubular body with a top side, a bottom side, an exterior facing side and a bed facing side. A first corner having a 70 degree angle is formed at an intersection of the bottom side with the bed facing side, a second corner having a 110 degree angle formed at an intersection of the bed facing side with the top, a third corner having a 90 degree angle at an intersection of the top side and the exterior facing side, and a fourth corner having a 90 degree angle at an intersection of the exterior facing side and the bottom side. The tubular body is further formed with two pairs of fastener receiving apertures in spaced apart relationship on the top side and the bottom side, and alternatively also with two more pairs formed into the bed facing side and the exterior facing side, with the fastener receiving apertures on the top side aligned with the fastener receiving apertures on the bottom side. Three or more diamond slits in spaced apart relationship are formed into each of the first, second, third and fourth corners of the tubular body to allow the tubular body to flex along the three or more diamond slits. A hollow interior space inside the tubular body has a trapezoidal cross section and a pair of opposed open ends each formed with a lip adapted to couple with a connector, allowing two or more landscape tools to be removably joined together.

In a second aspect of the invention, a plurality of connectors formed as tubular bodies having a trapezoidal cross section and two opposed ends with the tubular bodies of the plurality of connectors having 180, 90, 60 and 45 degree angles formed therein and sized and shaped to engage the lips of the landscape tool open ends.

In a third aspect of the invention, the landscape tool is part of a landscape tool assembly and further comprising a fastener sized and shaped to engage pairs of fastener receiving apertures formed in the top and bottom sides, whereby positioning the fastener into the pair of receiving apertures and into an adjacent ground surface secures the landscape tool to the ground surface.

In yet a fourth aspect of the invention, the landscape tool is about 4 feet long and the landscape tool and connectors are made of plastic or metal.

In yet a fifth aspect of the invention, the landscape tool, fasteners and connectors are part of a kit for marking and cutting landscape bed edges.

In yet a sixth aspect of the invention, a method of using the landscape tool, fasteners and connectors is comprised of the steps of positioning the landscape tool on the ground surface with the bed facing side positioned towards the landscape bed with the first corner positioned along the desired landscape bed edge, securing the landscape tool to the ground surface by positioning the first fastener into the first pair of fastener receiving apertures, securing the landscape tool to the ground surface at a second location along the landscape tool using the second fastener in the second pair of fastener receiving apertures while maintaining the first corner along the same desired landscape bed edge, positioning the shovel against the bed facing side of the landscape tool, and sliding the shovel downwards along the bed facing side towards and into the ground surface to cut a portion of the ground surface at the first corner, removing the cut portion of the ground surface from the first corner, and finally moving the shovel laterally along the bed facing side and repeating the steps of sliding and removing until the desired landscape bed edge is cut.

In yet a seventh aspect of the invention, the method further comprises a second landscape tool and a connector having a desired angle, and the steps of attaching the landscape tool to the second landscape tool by having the connector engage the first open end of the landscape tool and the second open end of the second landscape tool before or after the step of securing the landscape tool to the ground surface using the second fastener.

In yet an eight aspect of the invention, the method further comprises the steps of bending the landscape tool into a desired shape and securing the landscape tool in the desired shape to the ground surface with the first corner positioned along the desired landscape bed edge, and securing the landscape tool in the desired shape using as many fasteners engaging pairs of fastener receiving apertures as necessary to maintain the desired shape after the first step of securing.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figures 1, 7:
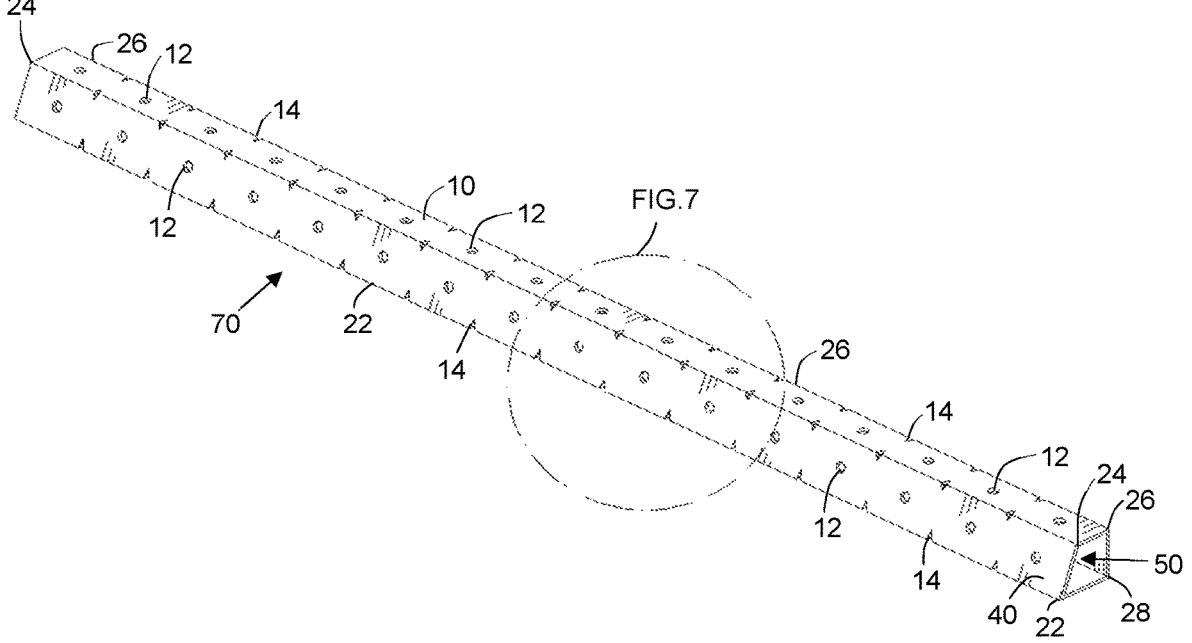
FIG. 1 is a perspective view of a landscape tool body section according to the invention viewed from a bed facing side.
FIG. 7 is a detail view taken from FIG. 1 showing a series of fastener receiving apertures and diamond shaped slits formed into the sides and corners of the body section.
Figure 2:
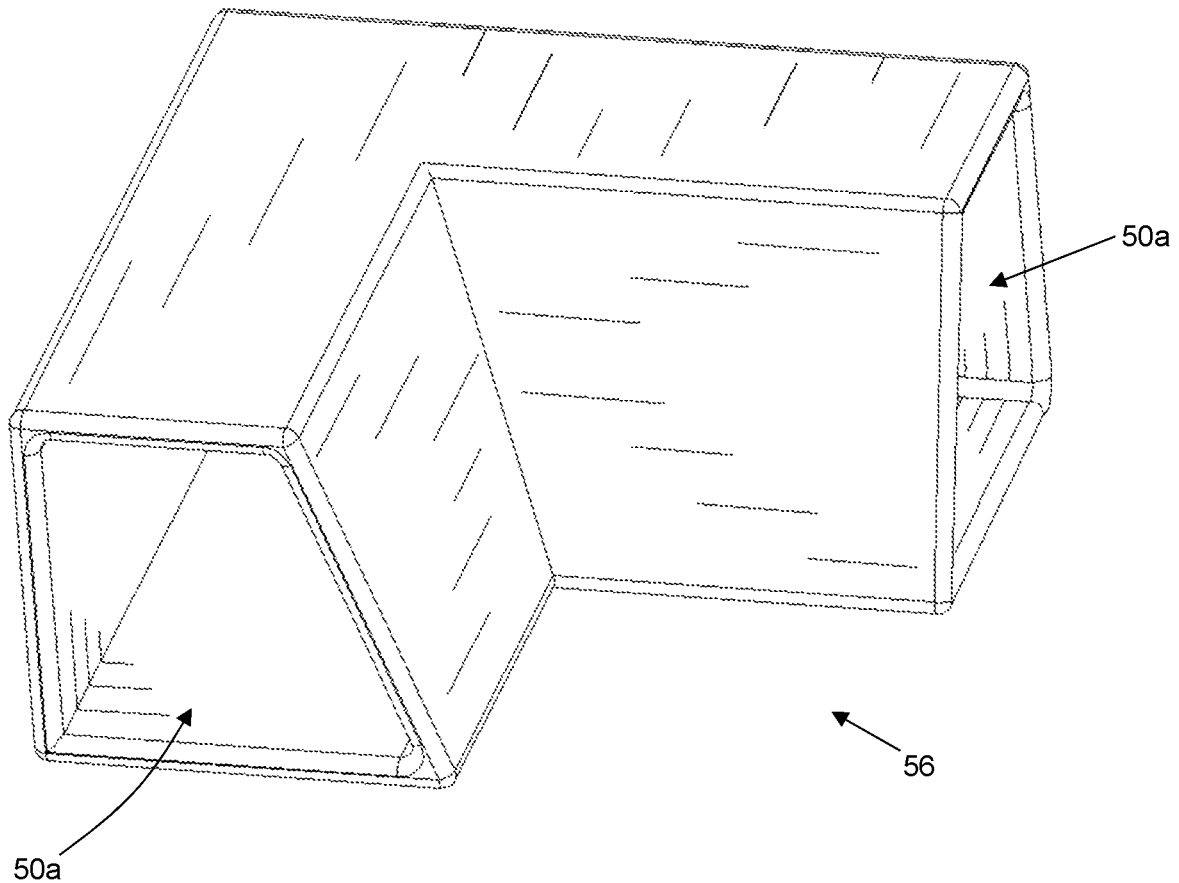
FIG. 2 is a perspective view of a 90 degree connector according to the invention.
Figure 3:
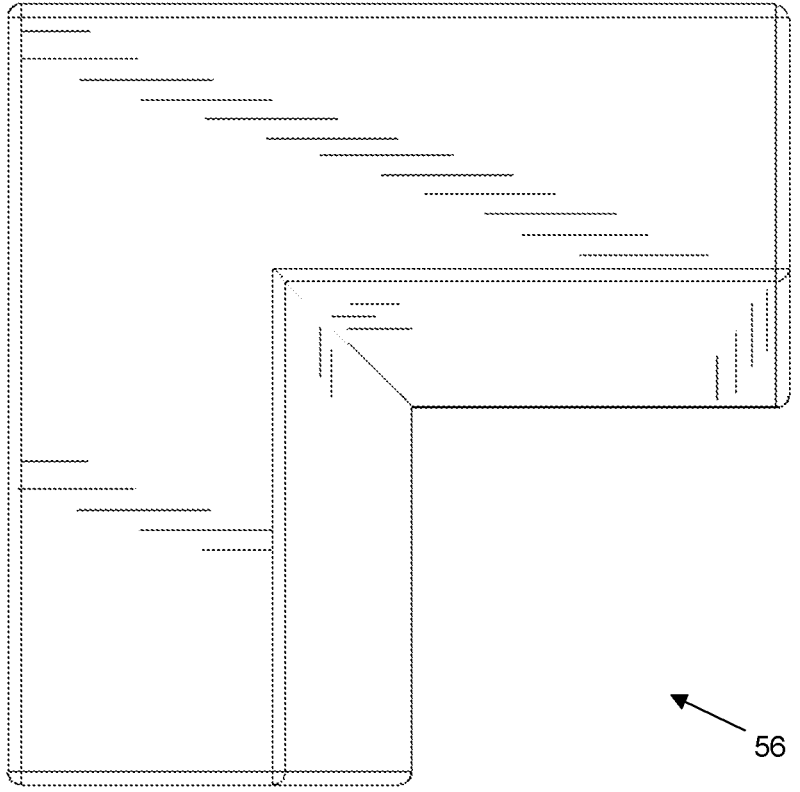
FIG. 3 is a top perspective view of the connector in FIG. 2.
Figure 4:
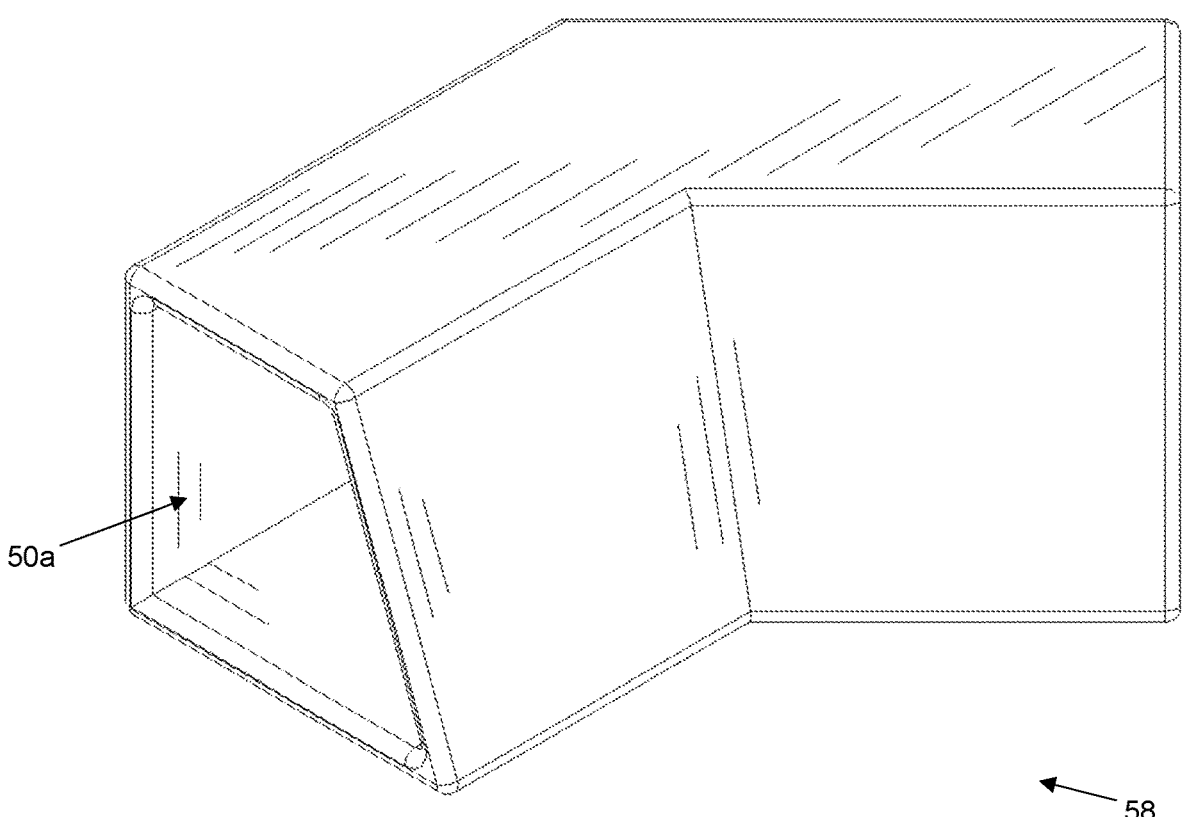
FIG. 4 is a perspective view of a 60 degree connector according to the invention.
Figure 4A:
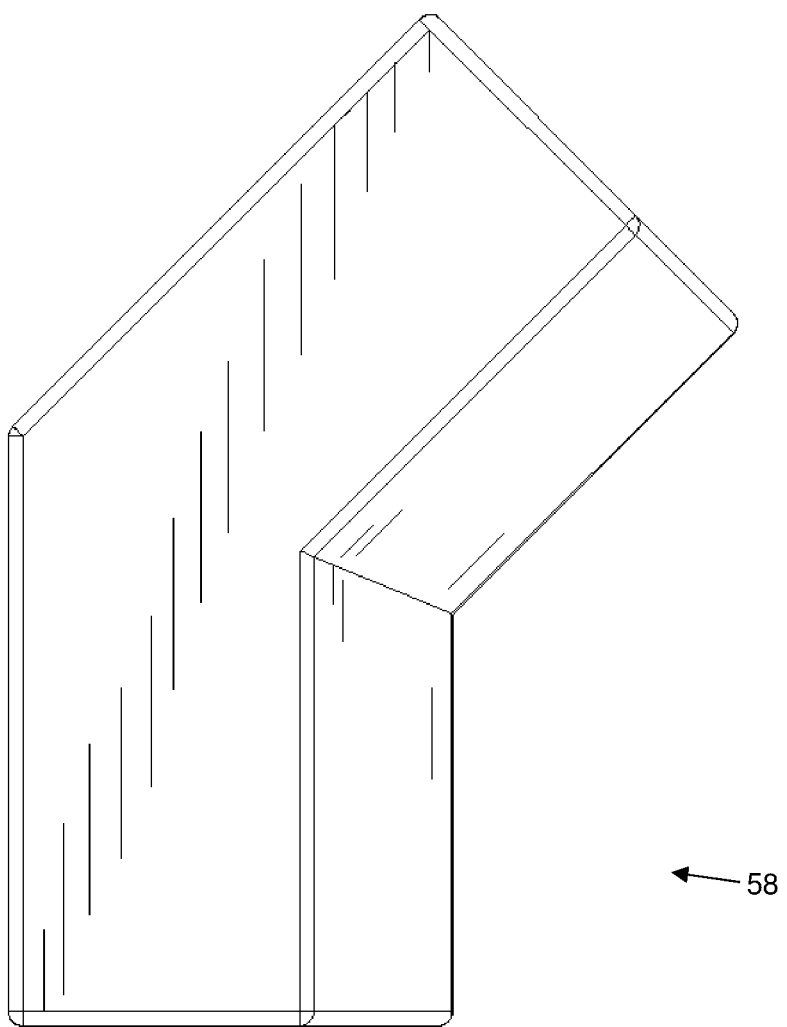
FIG. 4a is a top perspective view of the connector in FIG. 4.
Figure 5:
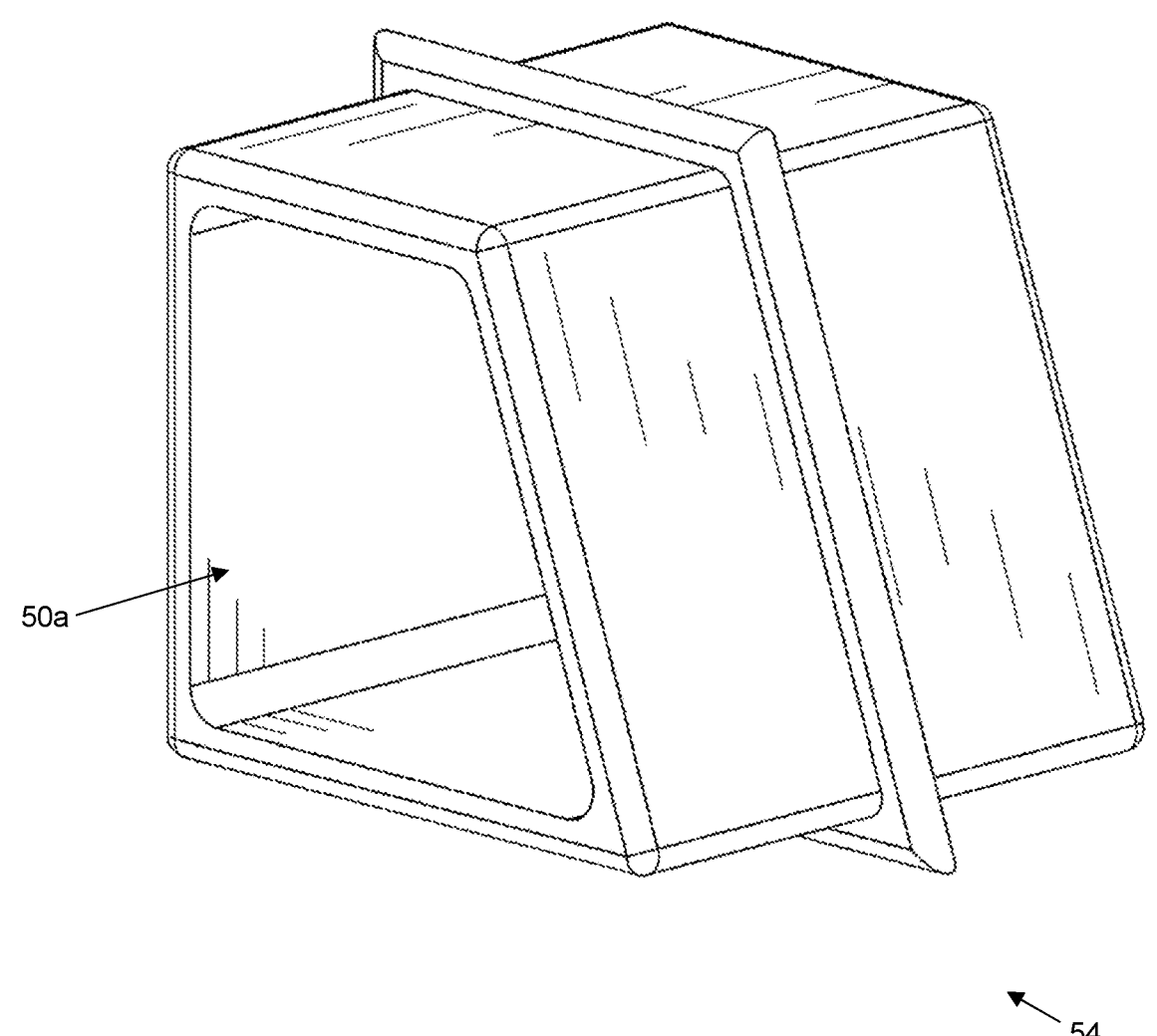
FIG. 5 is a perspective view of a 180 degree connector according to the invention.
Figure 6:
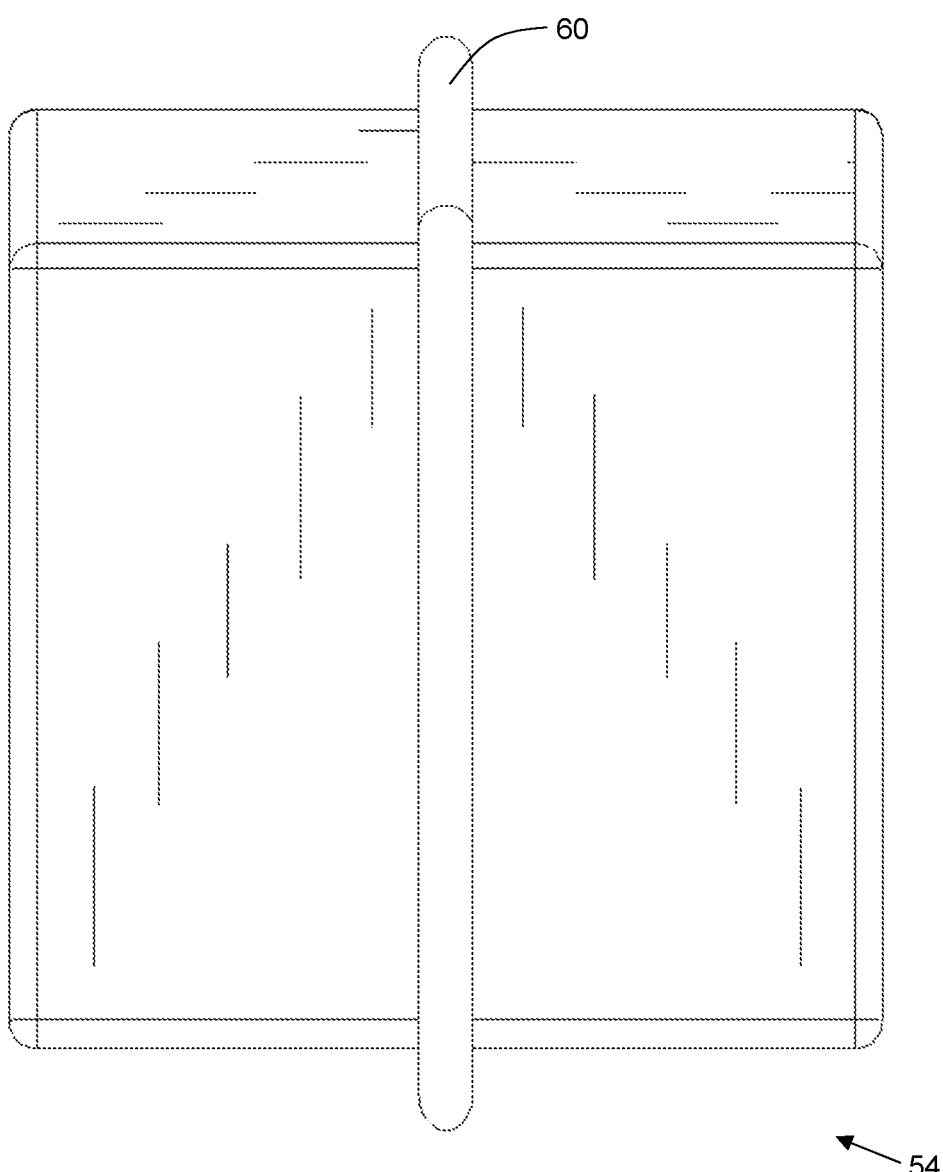
FIG. 6 is a top view of the connector in FIG. 5.
Figure 7:
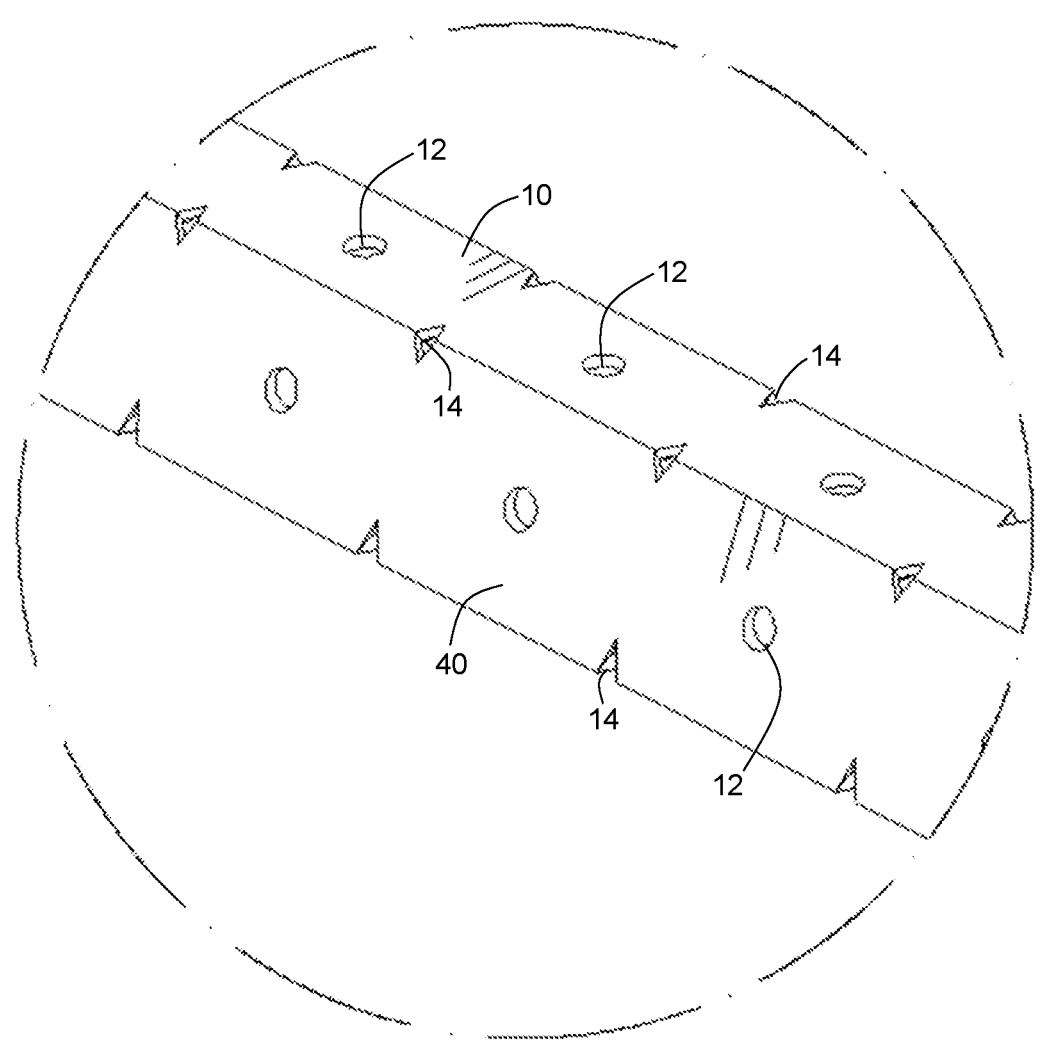
Figure 8:
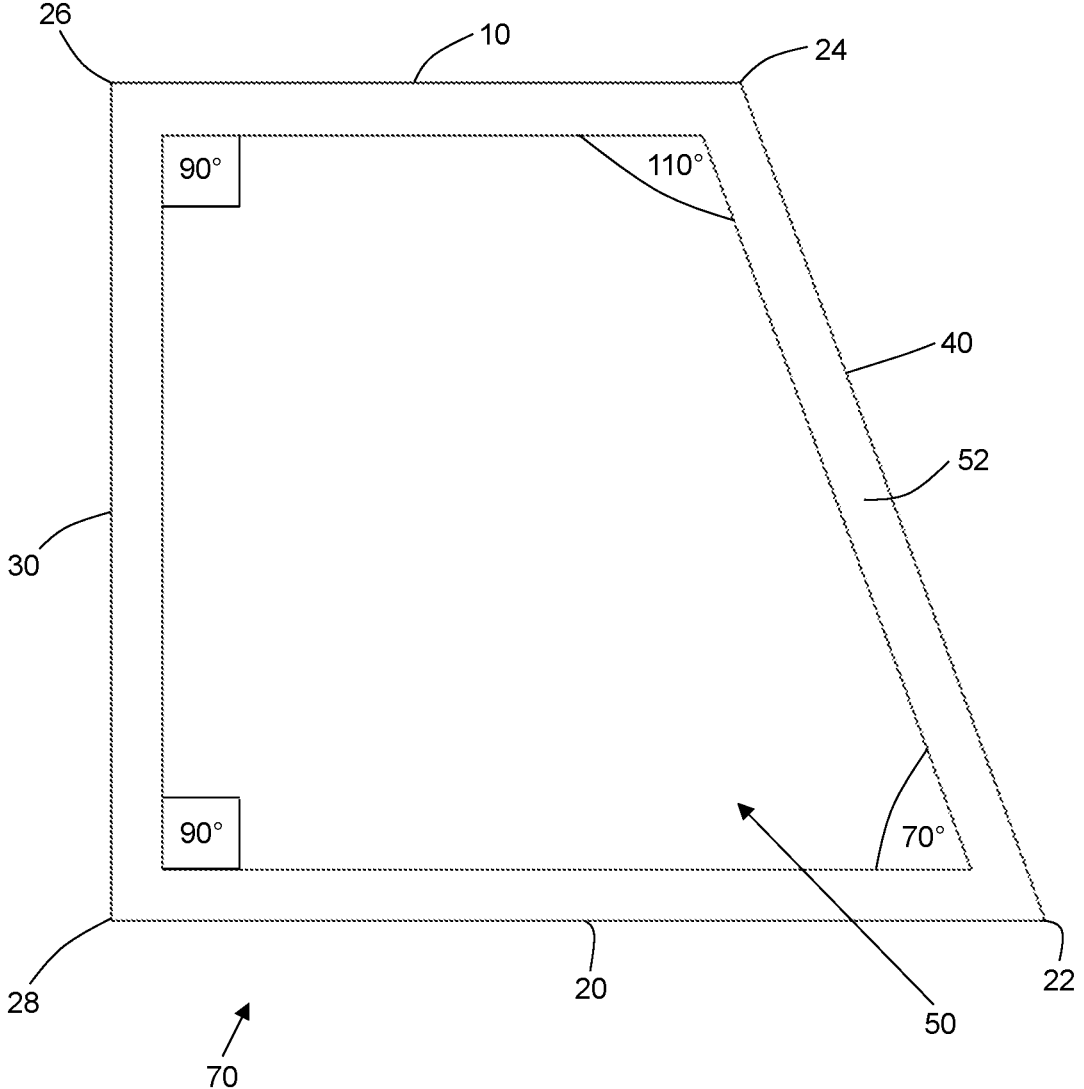
FIG. 8 is a side elevation view of the body section and showing the angles of the sides of the representative embodiment.
Figure 9:
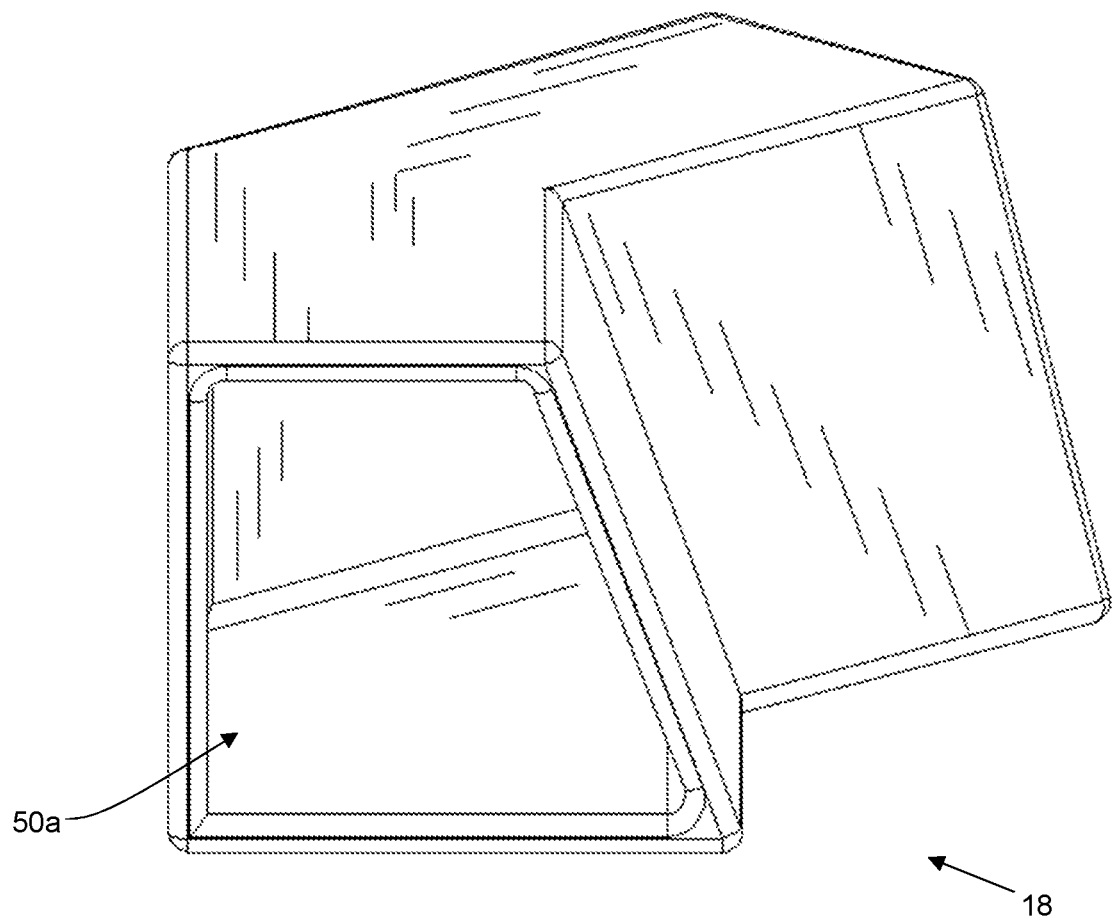
FIG. 9 is a perspective view of a 45 degree connector according to the invention.
Figure 10:
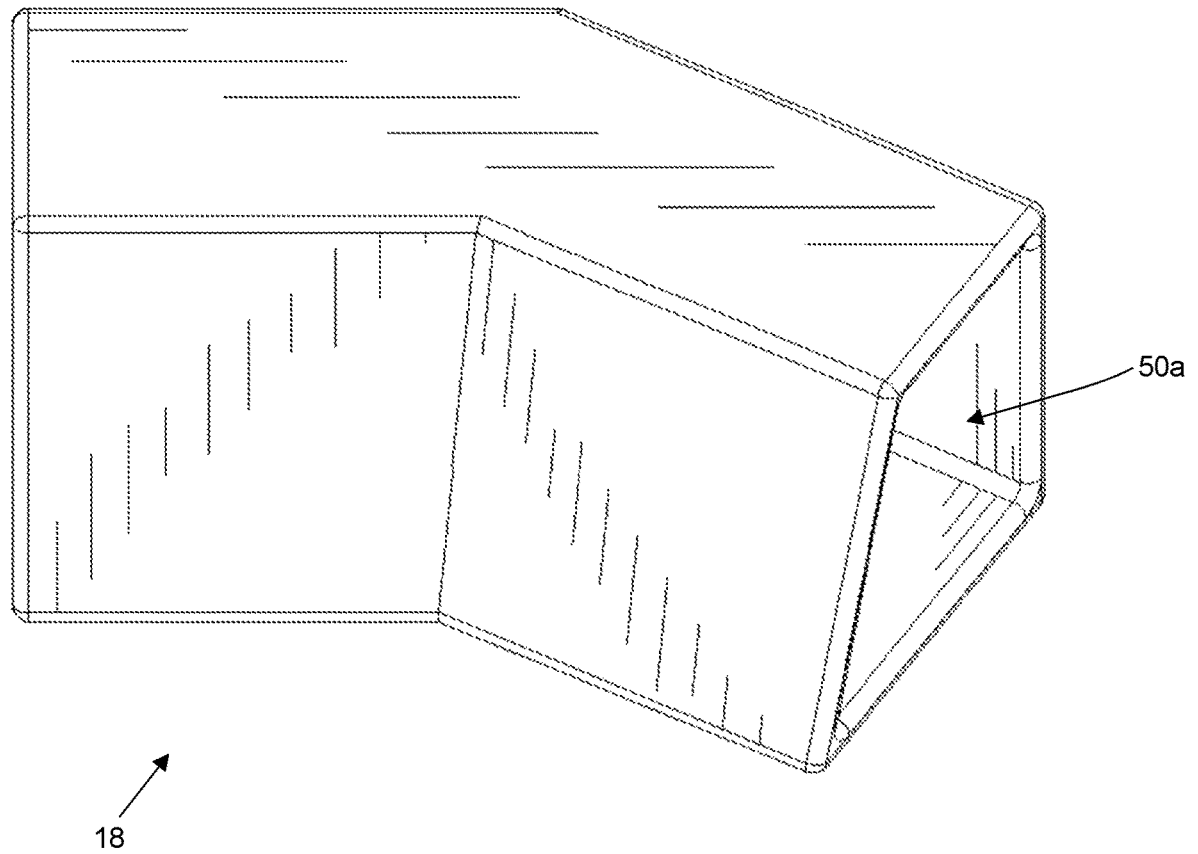
FIG. 10 is a second perspective view of the connector in FIG. 9.
Figure 11:
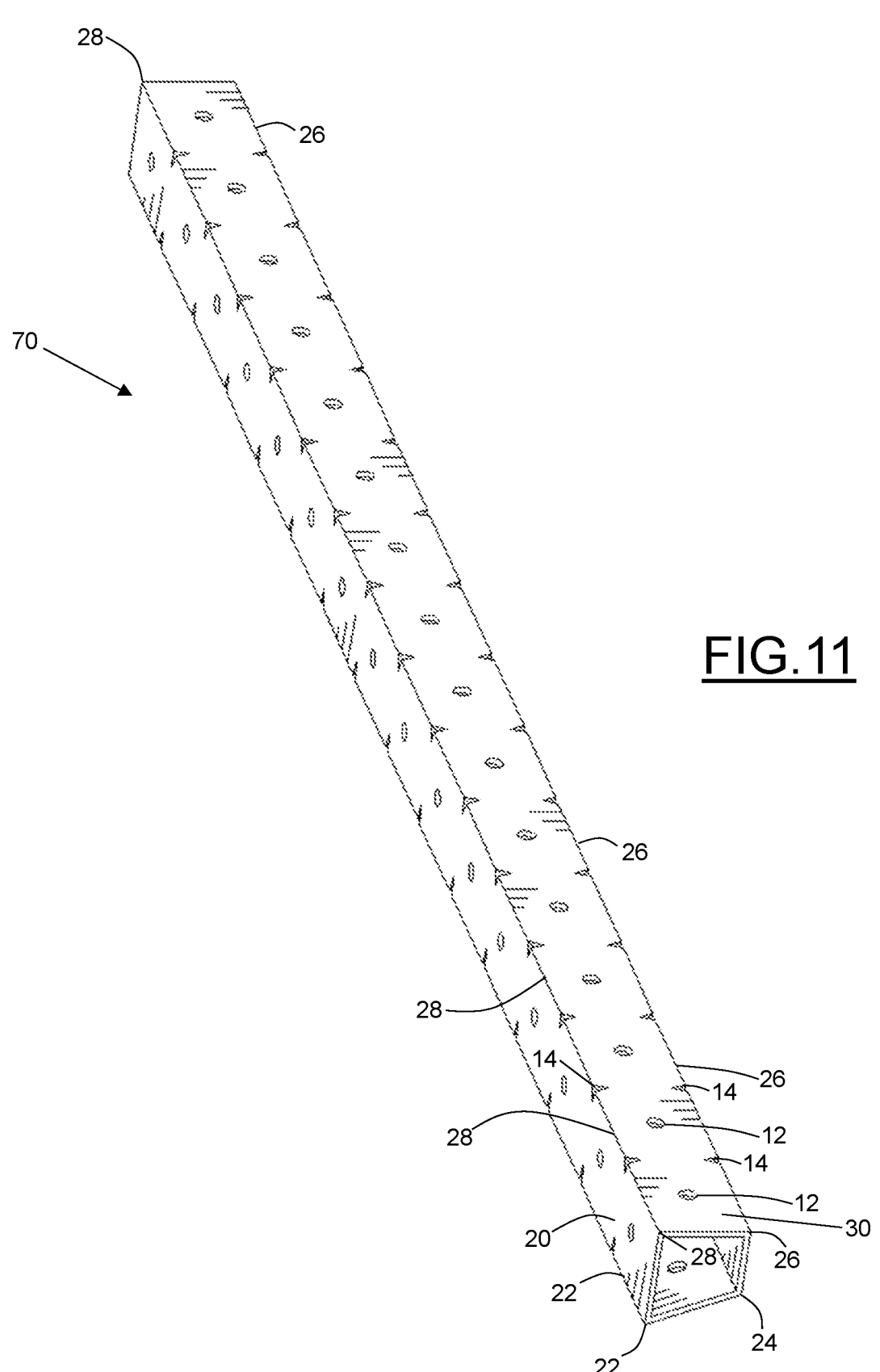
FIG. 11 is a second perspective view of the body section in FIG. 1, showing a bottom side and an exterior facing side.
Figure 12:
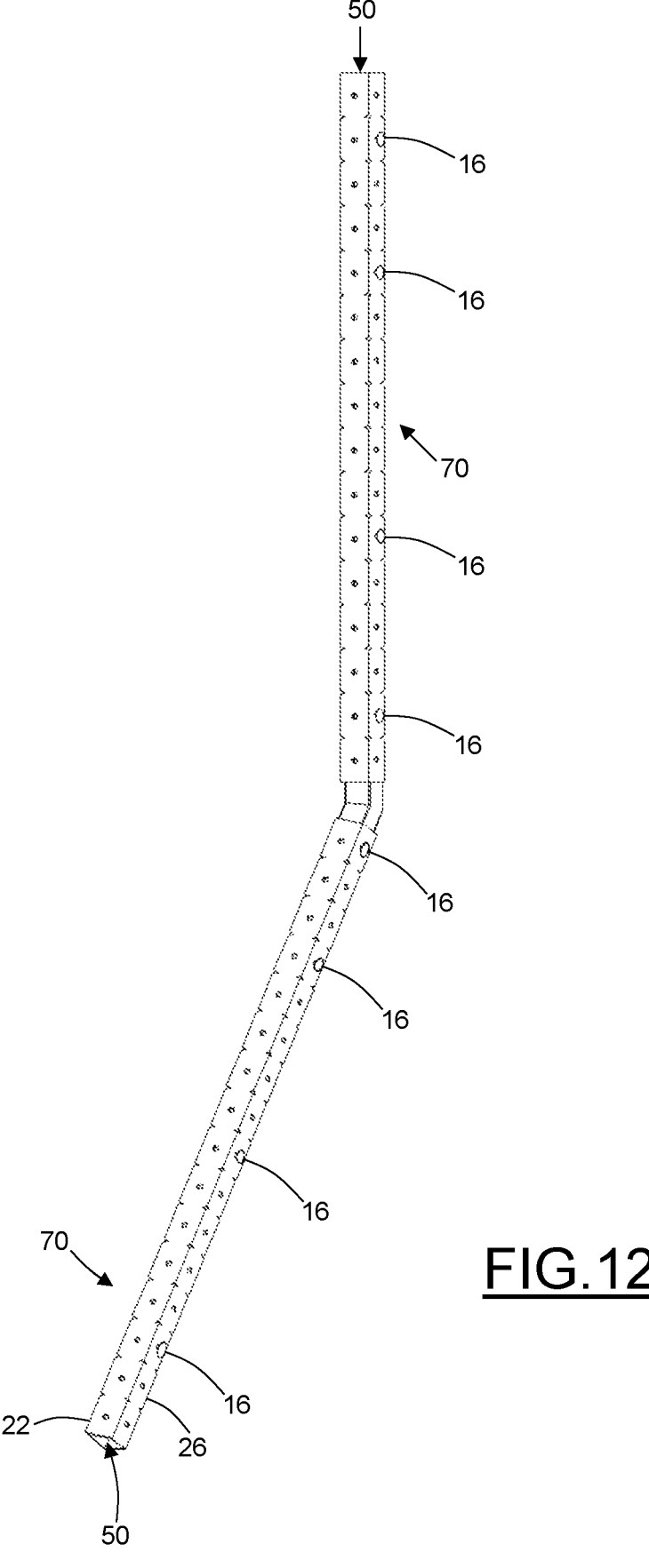
FIG. 12 is a perspective view of a pair of body sections joined with the 45 degree connector shown in FIGS. 9-10.
Figure 13:
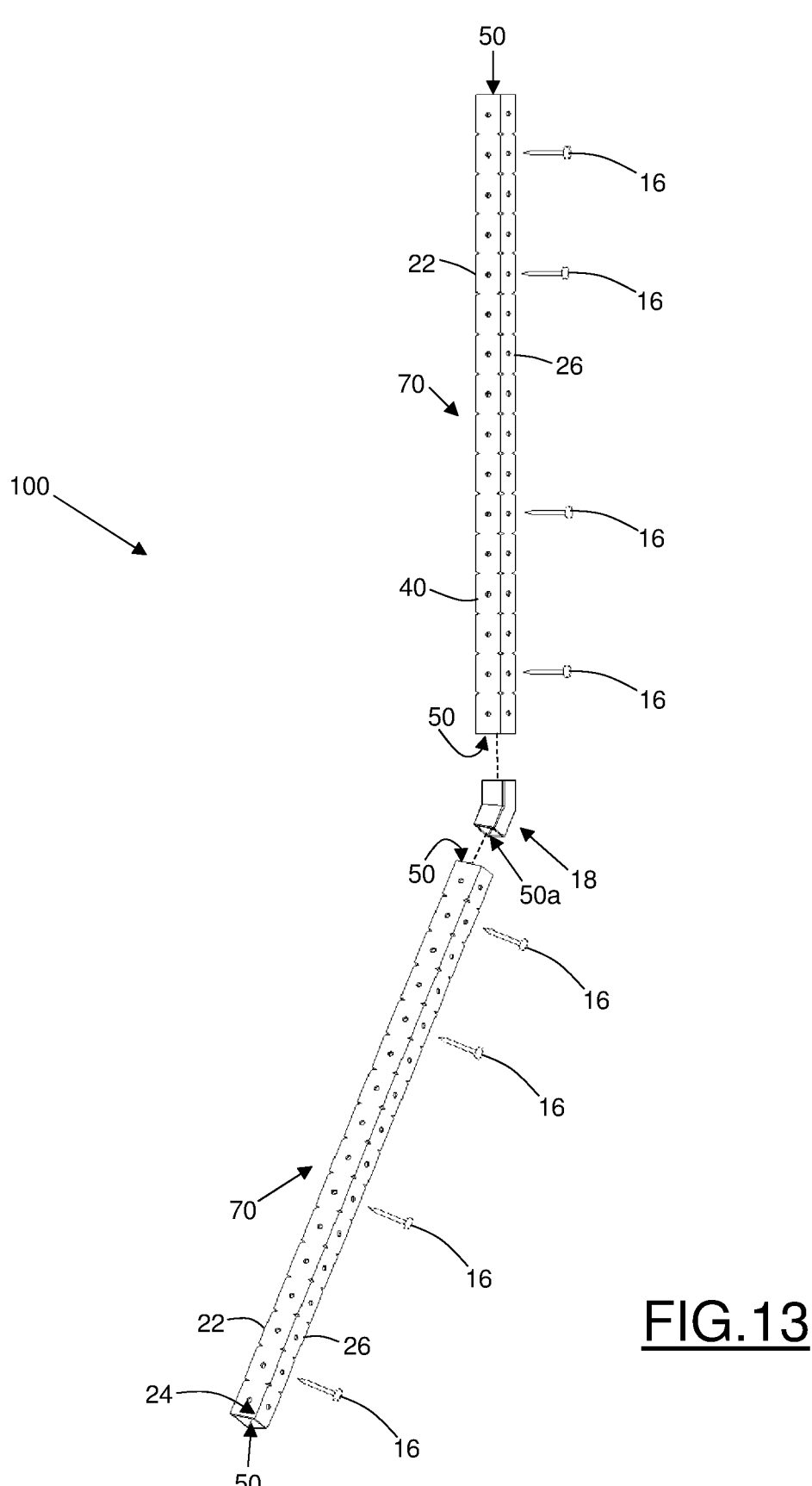
FIG. 13 is an exploded view of FIG. 12.

The following is a list of reference labels used in the drawings to label components of different embodiments of the invention, and the names of the indicated components.

100 landscape bed edging tool assembly
10 top side
12 stake aperture
14 diamond shaped slit or slit
16 pin or stake or fastener
18 45 degree connector
20 bottom side
22 first corner
24 second corner
26 third corner
28 fourth corner
30 exterior facing side
40 bed facing side
50 open end of tubular body
52 lip
54 straight or 180 degree connector
56 corner or 90 degree connector
58 triangle or 60 degree connector
60 flange
62 grass surface
64 landscape bed
66 shovel
70 landscape tool or body section
70a second body section
70b third body section
70c fourth body section

DETAILED DESCRIPTION

Figure 14:
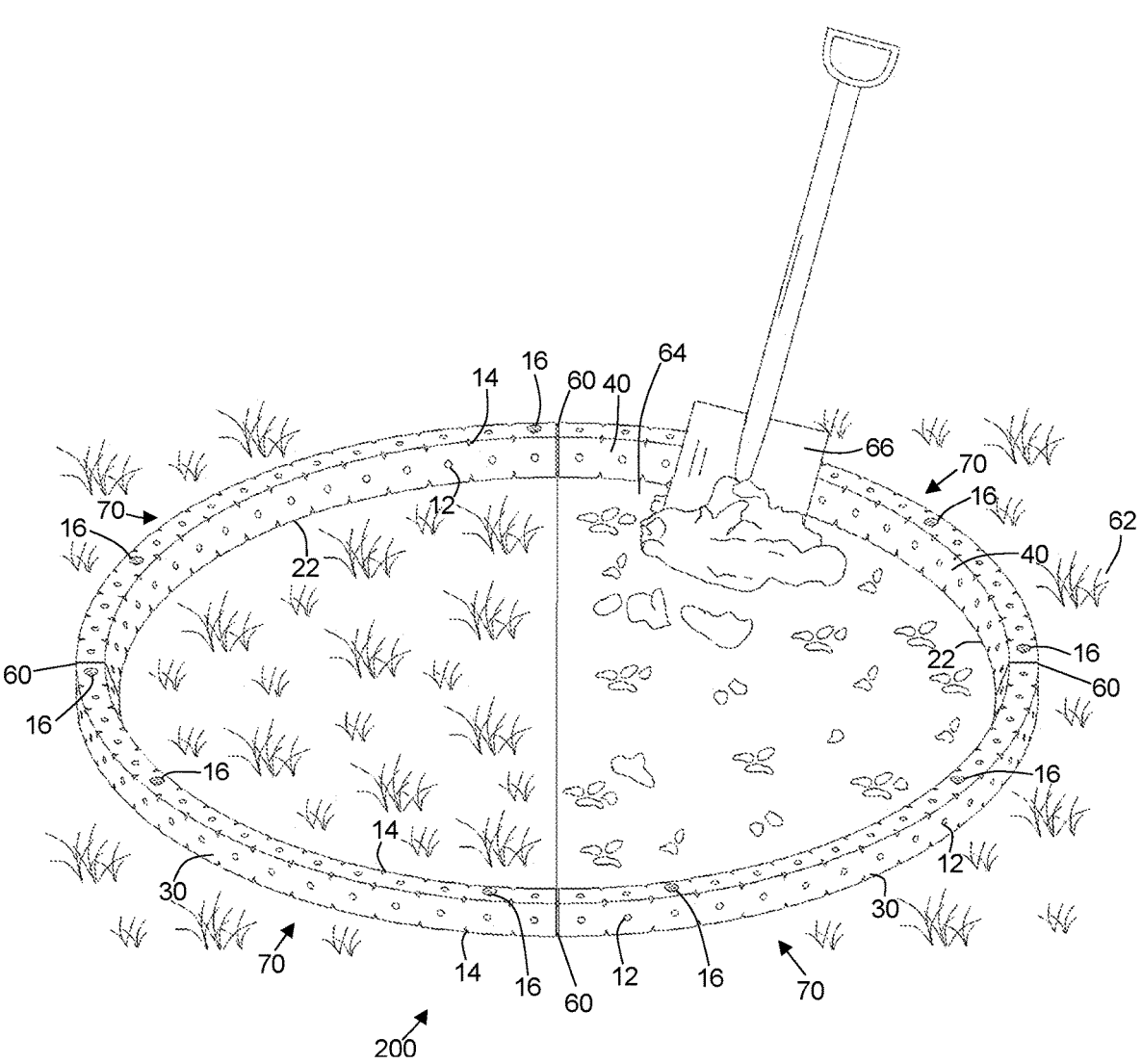
FIG. 14 is a perspective view of a landscape bed edging tool assembly according to the invention, with its components including a plurality of body sections, connectors and fasteners shown in a use position marking a proposed landscape bed and with an edging shovel in a use position along a bed facing side of one of the plurality of body sections.
Figure 15:
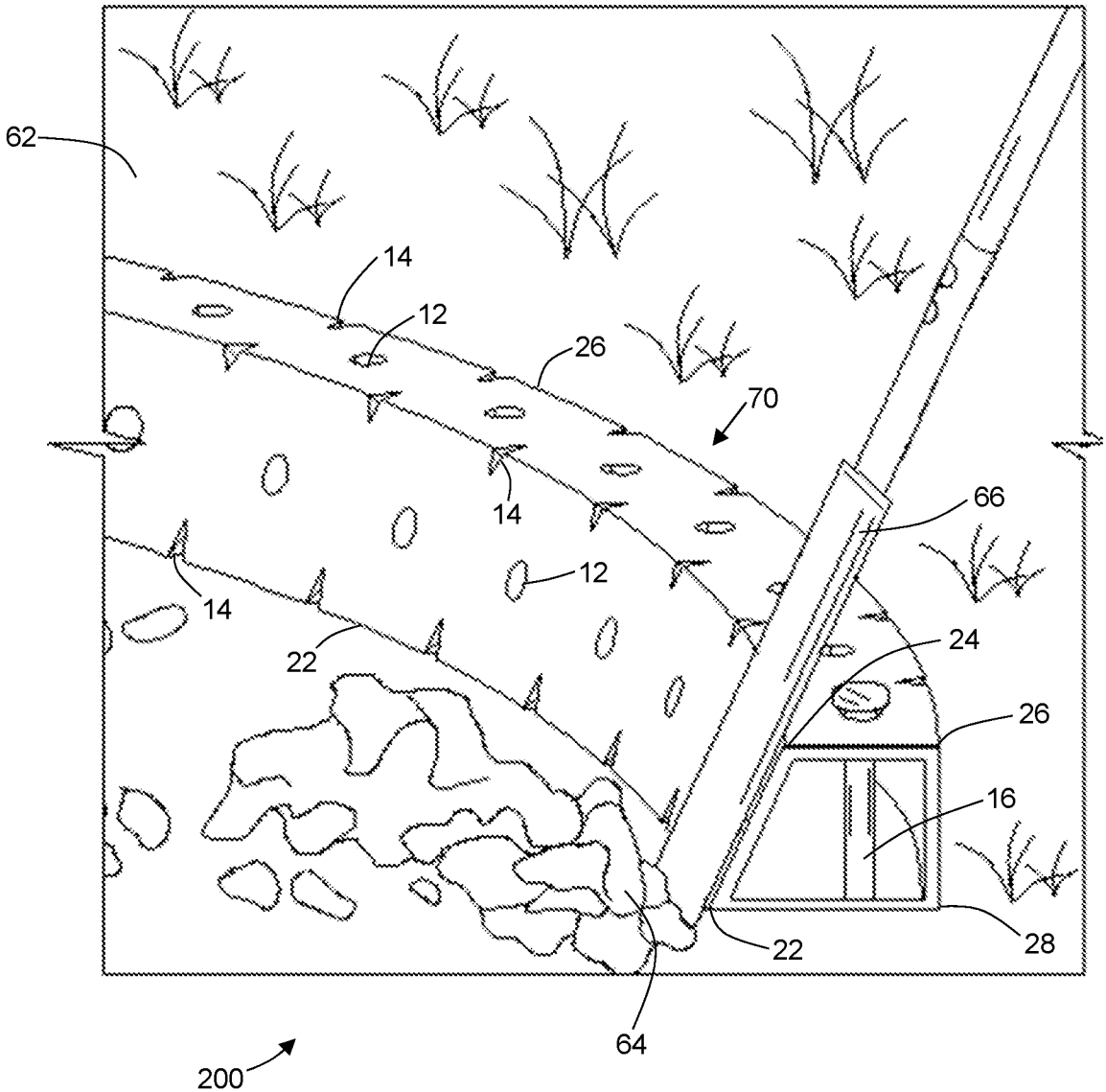
FIG. 15 is a cross sectional, side elevation view of the edging shovel and proposed landscape bed shown in FIG. 14, showing use of the edging shovel with the landscape bed edging tool assembly according to the invention.

A landscape bed edging tool assembly according to the invention or edge tool assembly 100 is comprised of a landscape tool or body section 70, a second landscape tool or second body section 70a and a plurality of connectors 18 54 56 58, are shown in FIGS. 1-13. A method of using the edge too assembly 100 is shown in FIGS. 14-15.

Turning to FIGS. 1, 7-8, and 11-13 the body section 70 is a trapezoidal prism with a flexible tubular body, a trapezoidal cross section, an interior space 50, four sides and a total of four corners, with each corner delineating where two sides meet. A bottom side 20 of the body section 70 in spaced apart parallel relationship to a top side 10, is connected to a bed facing side 40 at a first corner 22. The bed facing side 40 has an approximately 70 degree angle measured from the bottom side 20 to the bed facing side 40 along the interior space 50. The top side 10 of the body section 70 meets the bed facing side 40 at a second corner 24, having a 110 degree angle also measured along the interior space 50. A third corner 26 having a 90 degree angle is positioned where the top side 10 meets an exterior side 30. The exterior side 30 is joined to the bottom side 20 at the fourth corner 28 and has a 90 degree angle.

Each side 10 20 30 40 is further formed with a series of fastener receiving apertures 12 in regular spaced apart relationship and are sized and shaped to receive reusable pins or stakes or fasteners 16 that are pushed into the receiving apertures 12 to secure the body section 70 to a ground surface, typically a grass surface 62, when marking the location of the proposed landscape bed edge. The fasteners 16 are typically positioned through the receiving apertures 12 of the top side 10 and the bottom side 20 however they can also be positioned sideways through the exterior facing side 30 and angled into the receiving apertures 12 in the bottom side 20. The receiving apertures 12 on the bed facing side 40 and the exterior facing side 30 help a user see the fastener 16 position as well as removal of material lightens the body section 70 while assisting in the flexibility of the body section 70.

The first corner 22 at a lowermost end of the bed facing side 40 is positioned along the desired bed edge, with the bed facing side 40 facing towards a landscape bed 64. Diamond shaped slits or slits 14 formed into the first, second, third and fourth corners 22 24 26 28 of the body section 70 at regular spaced apart intervals allow the body section 70 to flex into a variety of fluid curves, and thus allow the user to create regular, symmetrical and smooth curves with ease at the proposed landscape bed site.

Each body section 70 is approximately four feet long with a lip 52 formed at each open end 50 of the body section 70, leading to the hollow interior space 50a, the opening 50 and lip 52 sized and shaped to receive a variety of connectors having different angles to connect the body section 70 to a second body section 70a. The connectors include a straight or 180 degree connector 54, allowing additional body sections 70a 70b 70c to be joined together to form a straight line or a circle, such as that shown in FIG. 14, and several corner connectors such as the 90 degree connector 56, allowing rectangular or square shaped beds to be created, a triangular or 60 degree connector 58 and a 45 degree connector 18, allowing triangular shaped beds to be created, or tighter angles, as desired. The 180 degree connector 54 is further formed with a flange 60 to evenly apportion the connector body within each opening 50 of the body sections 70 70a joined together by the connector 54. The fasteners 16 are inserted typically by hand and can be easily removed and repositioned as needed to adjust the final position of the first corner 22 prior to cutting with a shovel 66. The regularly spaced slits 14 along the corners 22 24 26 28 ensure that bends formed into the body section 70 are controlled and uniform. A tree ring is easily and quickly laid out using as few as two body sections 70 70, as shown in FIG. 14, joined with two 180 degree connectors 54. While the edge tool assembly 100 does not completely eliminate the need to measure to ensure consistent distance is maintained from a house, tree or other structure, the edge tool assembly 100 greatly simplifies marking of the final bed edge.

Turning to FIGS. 12-15, to make a landscape bed 64, the bottom side 20 is positioned on a grass surface 62, the with bed facing side 40 oriented towards the proposed landscape bed 64 area and the first corner 22 positioned at the proposed bed edge to be cut with the shovel 66. The fasteners 16 are positioned through the apertures 12 in the top side 10 and the bottom side 20 to secure the position of the body section 70. Adjustments to each body section 70 are easily made by removing and repositioning the body sections 70 70a 70b 70c and the fasteners 16, as needed. Connectors 18 54 56 58 can be added or removed as desired. For large beds or ones with long, curving or other shapes, multiple body sections 70 70a 70b 70c, connectors 18 54 56 58 and fasteners 16 are used to lay out the proposed bed edge. The edge tool assembly 100, sold as a kit, is ideally comprised of at least two body sections 70 70b and at least one or a combination of the connectors 189 54 56 58 plus fasteners 16. One advantage of the edge tool assembly 100 is that by using the connectors 54 56 58, it is scalable and thus multiple or larger kits can be sold with more body sections 70 70a 70b 70c and connectors 18 54 56 58, as desired.

Once the proposed landscape bed edge is marked by the tool body 70 and fastened via the fasteners 16, with connectors 18 54 56 58 used as needed, the user, typically a homeowner or contractor, will position the shovel 66, typically an edging shovel, against the face of the bed facing side 40 of the body section 70 as shown in FIGS. 14 and 15. The bed facing side 40 ensures a repeatable, 70 degree angled cut is easily made. Once the edge is cut, the edge tool assembly 100 components are removed and repositioned as needed as many times as required to complete cutting of the landscape bed edge. Upon completion, the cut material is removed and the new landscape planting bed 64 is revealed with a professional, smooth and fluid bed edge. The inventor notes that the bed facing side 40 can also be configured with any other desired angle and other body sections 70 can be made with a bed facing side having a 60, 40 or other angle. The exterior facing side 30 in the representative embodiment shown in the FIGS. could have a 45 degree angle, for instance, to allow the user two optional bed facing sides 40 with different angles to allow some flexibility in the cut edge. The ability to vary the angle of the landscape bed edge may be desirable in certain applications and the inventor notes that the 70 degree angle is an approximate industry standard for visual beauty but is not the only pleasing angled reveal for the landscape bed edge.

The edge tool assembly 100 has many advantages over the prior art equipment and bed edge design and cutting methods. There are no moving parts, no wheels and no motors that require electricity, fuel, replacement or routine maintenance. No training is required either to use the edge tool assembly 100 or its component parts 16 18 54 56 58 70, unlike the current methods and tools used to create landscape beds. The edge tool assembly 100 is lightweight and in the representative embodiment described herein, each body section 70 measures 4 ft long by 0.5 ft wide and 2 inches thick and requires about 0.012 cu ft of storage space only. The edge tool assembly 100 thus easily stores behind a truck seat, on a shelf, hanging on a wall, or in truck side compartments. The connectors 18 54 56 58 used in conjunction with the body sections 70 70a 70b 70c allow unlimited landscape bed shapes, from straight lines to full circles, as well as irregular shapes. The edge tool assembly 100 thus allows a wide range of formal, informal, and whimsical or otherwise uniquely shaped beds to be easily, quickly and efficiently created on site as easily as it can be imagined and drawn on paper.

Currently, a landscape architect draws proposed landscape beds using a top view, however, the edge tool assembly 100 allows the architect to lay out the proposed design on site for a client to see, while allowing for easy adjustment in the field. Such in-time, on-site visual reproduction of the bed is helpful for the client, who often has difficulty visualizing the proposed design from the top view drawing or computer rendering. The edge tool assembly 100 is easily used for do-it-yourself designs and installations, allowing field-design bed layouts and shapes without professional assistance. The edge tool assembly 100 eliminates the standard, antiquated way of laying out proposed landscape bed shapes using a garden hose or marking paint, simplifying and speeding up installation of a beautiful, custom designed bed.

The body section 70 and connectors 18 54 56 58 are made of plastic or any other durable material that is flexible, allowing for ease of use and portability, but any other suitable rigid material can be used, including metal, so long as the slits 14 allow sufficient flexing of the body section 70.

It is to be understood that the above-described arrangements are only illustrative of the application of the principles of the present invention. Numerous modifications and alternative arrangements may be devised by those skilled in the art without departing from the scope of the present invention. The inventor notes that the corner angles detailed in the representative embodiment in the FIGS. are illustrative only and are not meant to limit the invention to just what is shown. The first corner for instance could have an angle ranging from about 60 to 80 degrees, the second corner could have an angle ranging from about 100 to 120 degrees, and the third and fourth corners having angles taking up the remaining degrees inside the trapezoidal shape. Hence, if the first corner is actually 75 degrees instead of 70 degrees, this is well within the invention and differences in the corner angles may be desired in certain applications. The connector angles thus will also be accordingly adjusted to fit the tubular body of the body section.

I claim:

1. A landscape tool for marking a landscape bed edge on a ground surface, the landscape tool comprising:
a trapezoidal prism having a tubular body with a top side, a bottom side, an exterior facing side and a bed facing side;
a first corner having a first angle formed at an intersection of the bottom side with the bed facing side;
a second corner having a second angle formed at an intersection of the bed facing side with the top;
a third corner having a third angle at an intersection of the top side and the exterior facing side;
a fourth corner having a fourth angle at an intersection of the exterior facing side and the bottom side;
a first pair of fastener receiving apertures in spaced apart relationship, one of the pair formed in the top side and the second of the pair formed into the bottom side and aligned with the fastener receiving hole in the top side;
a second pair of fastener receiving apertures in spaced apart relationship, one of the pair formed into the top side and the second of the pair formed into the bottom side and aligned with the fastener receiving hole in the top side;
three or more diamond slits in spaced apart relationship formed into each of the first corner, second corner, third corner and fourth corner; and

a hollow interior space inside the tubular body having a trapezoidal cross section;
wherein the first angle ranges between about 60 and 80 degrees;
wherein the second angle ranges between about 100 and 120 degrees;
wherein the tubular body of the trapezoidal prism has a first open end and an opposed second open end, each of the first open end and the second open end formed with a lip,
whereby the tubular body can flex and temporarily change shape along the three or more diamond slits.

2. The landscape tool in claim 1, further comprising a connector adapted to engage the lip and one of the first open end and the opposed second open end of the tubular body of the trapezoidal prism.

3. The landscape tool in claim 1, wherein either the bed facing side, the exterior facing side or both the bed facing side and exterior facing side are formed with two or more fastener receiving apertures having a same size and shape as the first pair of fastener receiving apertures.

4. The landscape tool in claim 1, further comprising a fastener sized and shaped to engage the first pair of fastener receiving apertures, whereby positioning the fastener into the first pair of receiving apertures and into an adjacent ground surface secures the landscape tool to the ground surface.

5. The landscape tool in claim 2, wherein the connector has a connector tubular body with a trapezoidal cross section and a pair of opposed open ends sized and shaped to engage the lip of the tubular body of the landscape tool.

6. The landscape tool in claim 5, wherein the tubular body of the connector is formed with a bend having a 45 degree angle.

7. The landscape tool in claim 5, wherein the tubular body of the connector is formed with a bend having a 60 degree angle.

8. The landscape tool in claim 5, wherein the tubular body of the connector is formed with a bend having a 90 degree angle.

9. The landscape tool in claim 5, wherein the tubular body of the connector has straight sides and forms a 180 degree angle, and having a flange positioned at an approximate center of the tubular body to apportion about half of the tubular body inside the landscape tool open end and another half of the tubular body inside the second landscape tool open end.

10. The landscape tool in claim 1 wherein the tubular body is about 4 feet long.

11. The landscape tool in claim 1, wherein the tubular body is made of plastic.

12. The landscape tool in claim 2, wherein either the connector, the tubular body or both the connector and the tubular body are made of plastic.

13. The landscape tool in claim 2, wherein either the connector, the tubular body, or both the connector and the tubular body are made of metal.

14. A method of using a landscape tool to mark a desired landscape bed edge on a ground surface and then serve as a cutting guide for a shovel to cut the marked landscape bed edge, the method comprising the steps of: positioning the landscape tool of claim 1 on the ground surface with the bed facing side positioned towards the landscape bed with the first corner positioned along the desired landscape bed edge;

securing the landscape tool to the ground surface by positioning the first fastener into the first pair of fastener receiving apertures;

securing the landscape tool to the ground surface at a second location along the landscape tool using the second fastener in the second pair of fastener receiving apertures while maintaining the first corner along the same desired landscape bed edge;

positioning the shovel against the bed facing side of the landscape tool; and sliding the shovel downwards along the bed facing side towards and into the ground surface to cut a portion of the ground surface at the first corner;

removing the cut portion of the ground surface from the first corner; and moving the shovel laterally along the bed facing side and repeating the steps of sliding and removing until the desired landscape bed edge is cut.

15. The method in claim 14, further comprising a second landscape tool having a first open end, a second open end, and a connector having a desired angle, and further comprising the step of:

attaching the landscape tool to the second landscape tool by having the connector engage the first open end of the landscape tool and the second open end of the second landscape tool;

before or after the step of securing the landscape tool to the ground surface using the second fastener.

16. The method in claim 15, further comprising the steps of:

bending the landscape tool into a desired shape and securing the landscape tool in the desired shape to the ground surface with the first corner positioned along the desired landscape bed edge; and further securing the landscape tool in the desired shape using additional fasteners individually engaging respective pairs of fastener receiving apertures to maintain the desired shape; after the step of securing the landscape tool to the ground surface by positioning the first fastener into the first pair of fastener receiving apertures.

* * * * *